UNITED STATES PATENT OFFICE.

THEODORE W. CASE, OF SCIPIO, NEW YORK.

RESISTANCE ELEMENT.

1,298,627.      Specification of Letters Patent.      Patented Mar. 25, 1919.

No Drawing.     Application filed February 19, 1917. Serial No. 149,704.

*To all whom it may concern:*

Be it known that I, THEODORE W. CASE, a citizen of the United States of America, and resident of Scipio, in the county of Cayuga, in the State of New York, have invented new and useful Improvements in Resistance Elements, of which the following is a full, clear, and exact description.

This invention relates to certain improvements in resistance elements showing a variable resistance, and specifically contemplates a material as an element of an electric circuit, subject to the condition that variations in light produce a corresponding variation in the electrical resistance of the element, thereby effecting a change of current in accordance with variations of light intensity to which the element is exposed.

The object, therefore, of the invention is the production of a material adapted to form a portion of an electric circuit or conductor, the resistance of which diminishes as the intensity of the light to which it is exposed increases.

I have discovered that a compound or material consisting of or containing lead, antimony and sulfur in varied proportions can be utilized as a portion of an electric circuit, and that its resistance to the passage of currents through said circuit varies under the influence of light to effect a change of current in accordance with the intensity of the light rays to which the substance is subjected, and that a lead antimony sulfid is peculiarly efficient for this purpose and highly sensitive to variation of light intensity due to the fact that it is practically a non-conductor of electricity in absolute dark and the ratio of change or percentage change of its resistance to the passage of an electric current under variations of light intensity is very great.

An interesting phenomenon of the invention consists in the fact that the electrical resistance of the compound or material specified is varied by rays of light invisible to the human eye, such variation of current being readily demonstrated and measured by known apparatus. This variation in resistance is maximum in the infra red region of the spectrum, although the longer heat waves do not show any appreciable action.

The compound, material or resistance element may be incorporated in an electric circuit in any suitable way, as by laying crystals of the same in contact with each other, the terminal crystals connected in the circuit, and may constitute any portion or part of such circuit and when so embodied the crystals may be supported in any suitable way for contact with each other and exposure to light rays.

The invention is adapted for and may be applied to various uses, as, for instance, in the Bell photophone, and I therefore desire to broadly claim the same without restriction as to the method, manner or condition of use and without limitation as to the addition of other elements to the compound not destroying its usefulness for this purpose, and for use with both direct and alternating current and the expression "light rays" as used in the specification and claims hereof is deemed to include both visible and invisible rays.

What I claim is:

1. A resistance element formed of a compound of lead, antimony and sulfur.

2. An element interposed in an electric circuit and comprising a lead, antimony sulfid.

3. An electric circuit having a portion supported for exposure to light rays, such portion comprising a compound of lead, antimony and sulfur.

4. A variable resistance element adapted to be interposed in an electric circuit for exposure to light rays, and comprising a series of contacting lead, antimony sulfid crystals.

In witness whereof I have hereunto set my hand this 14th day of February, 1917.

THEODORE W. CASE.

Witnesses:
     E. A. THOMPSON,
     HOWARD P. DENISON.